US006973394B2

(12) United States Patent
Jaeger et al.

(10) Patent No.: US 6,973,394 B2
(45) Date of Patent: Dec. 6, 2005

(54) DEVICE FOR REMOTE POWER FEEDING A TERMINAL IN A TELECOMMUNICATION NETWORK, AND A CONCENTRATOR AND A REPREATER INCLUDING THE DEVICE

(75) Inventors: Rémy Jaeger, Eckbolsheim (FR); Mark Medlicott, Illkirch (FR); Gérard Vergnaud, Franconville (FR); Vincent Guntz, Obernal (FR)

(73) Assignee: Alcatel, Paris (FR)

( * ) Notice: Subject to any disclaimer, the term of this patent is extended or adjusted under 35 U.S.C. 154(b) by 727 days.

(21) Appl. No.: 10/028,915

(22) Filed: Dec. 28, 2001

(65) Prior Publication Data

US 2002/0091951 A1     Jul. 11, 2002

(30) Foreign Application Priority Data

Jan. 8, 2001   (FR) .................................. 01 00168

(51) Int. Cl.⁷ ............................................ G01R 19/00
(52) U.S. Cl. ..................... 702/64; 713/300; 713/340
(58) Field of Search .............................. 702/57, 60–61, 702/64–65, 122, 189; 370/245, 252, 908, 370/899, 401; 361/66; 713/300, 310, 340

(56) References Cited

U.S. PATENT DOCUMENTS

| | | | |
|---|---|---|---|
| 4,431,869 A | | 2/1984 | Sweet .......................... 379/378 |
| 4,953,055 A | * | 8/1990 | Douhet et al. ................. 361/62 |
| 5,144,544 A | * | 9/1992 | Jenneve et al. ................ 363/49 |
| 6,218,930 B1 | * | 4/2001 | Katzenberg et al. ... 340/310.01 |
| 6,236,664 B1 | * | 5/2001 | Erreygers ..................... 370/492 |
| 6,603,220 B2 | * | 8/2003 | Vergnaud ...................... 307/64 |
| 6,643,566 B1 | * | 11/2003 | Lehr et al. ................... 700/286 |
| 6,715,087 B1 | * | 3/2004 | Vergnaud et al. ........... 713/300 |
| 6,847,718 B1 | * | 1/2005 | Hiraoka ....................... 379/413 |

FOREIGN PATENT DOCUMENTS

| EP | 0981277 A2 | 2/2000 |
|---|---|---|
| WO | WO 9623377 | 8/1996 |

OTHER PUBLICATIONS

Patent Abstracts of Japan, Apr. 6, 2001 vol. 2000. No. 15 & JP 2000349754 A(NEC Shizuoka Ltd) Dec. 15, 2000.

* cited by examiner

*Primary Examiner*—Marc S. Hoff
*Assistant Examiner*—Mary Catherine Baran
(74) *Attorney, Agent, or Firm*—Sughrue Mion, PLLC

(57) ABSTRACT

A first resistor is connected in parallel with a second resistor having a lower resistance than the first resistor. The voltage at the terminal of the first resistor is compared with a first threshold voltage, and the voltage at the terminals of the second resistor is compared with a second threshold voltage. A switching device either connects the first resistor in series in a remote power feed circuit, if the switching device detects that the remote power feed current is less than a third threshold current that is between the first and second threshold currents, or connects the second resistor and the first resistor, connected in parallel, in series in the remote power feed circuit if the switching device detects that the remote power feed current is greater than the third threshold current.

6 Claims, 6 Drawing Sheets

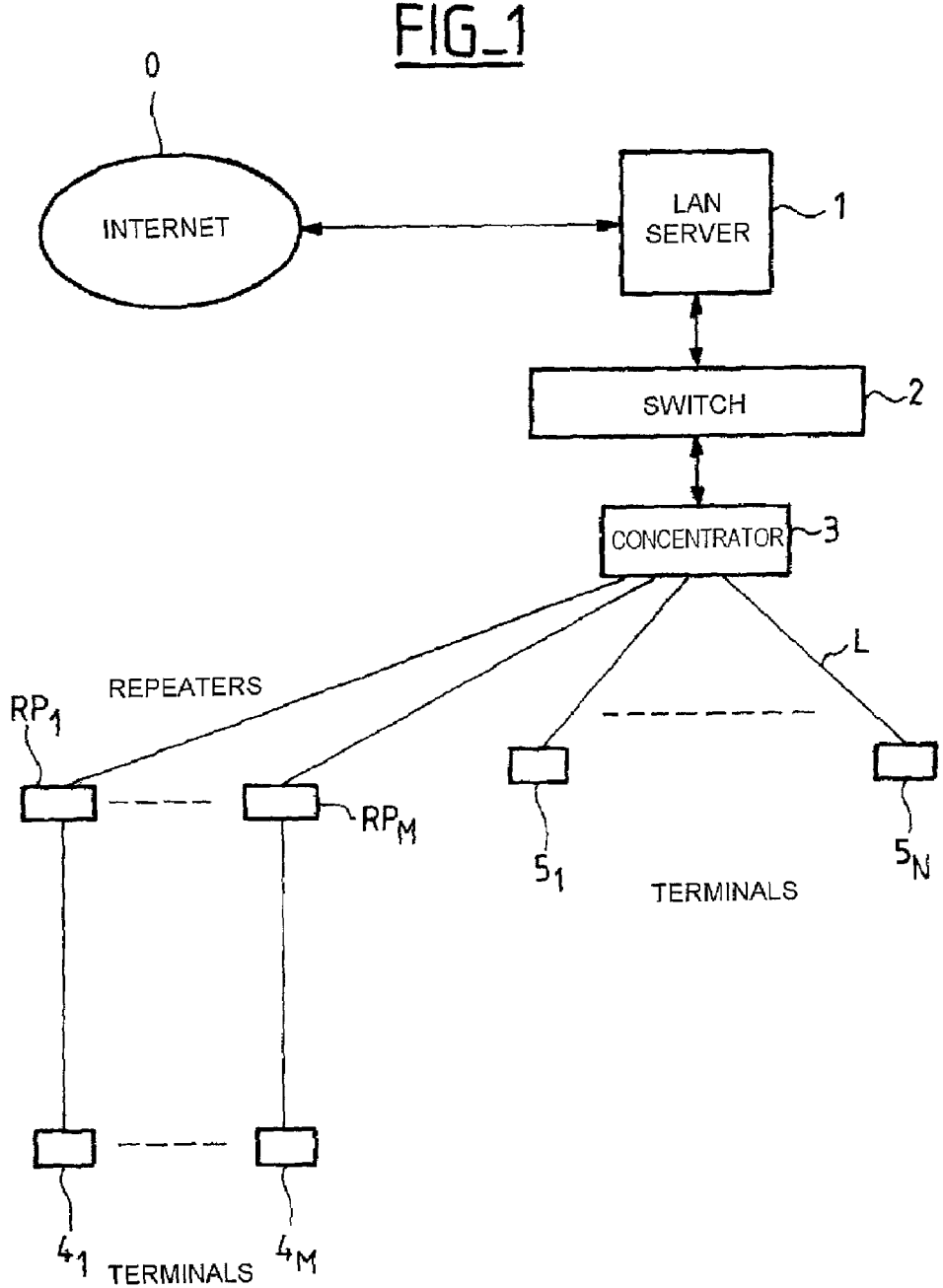

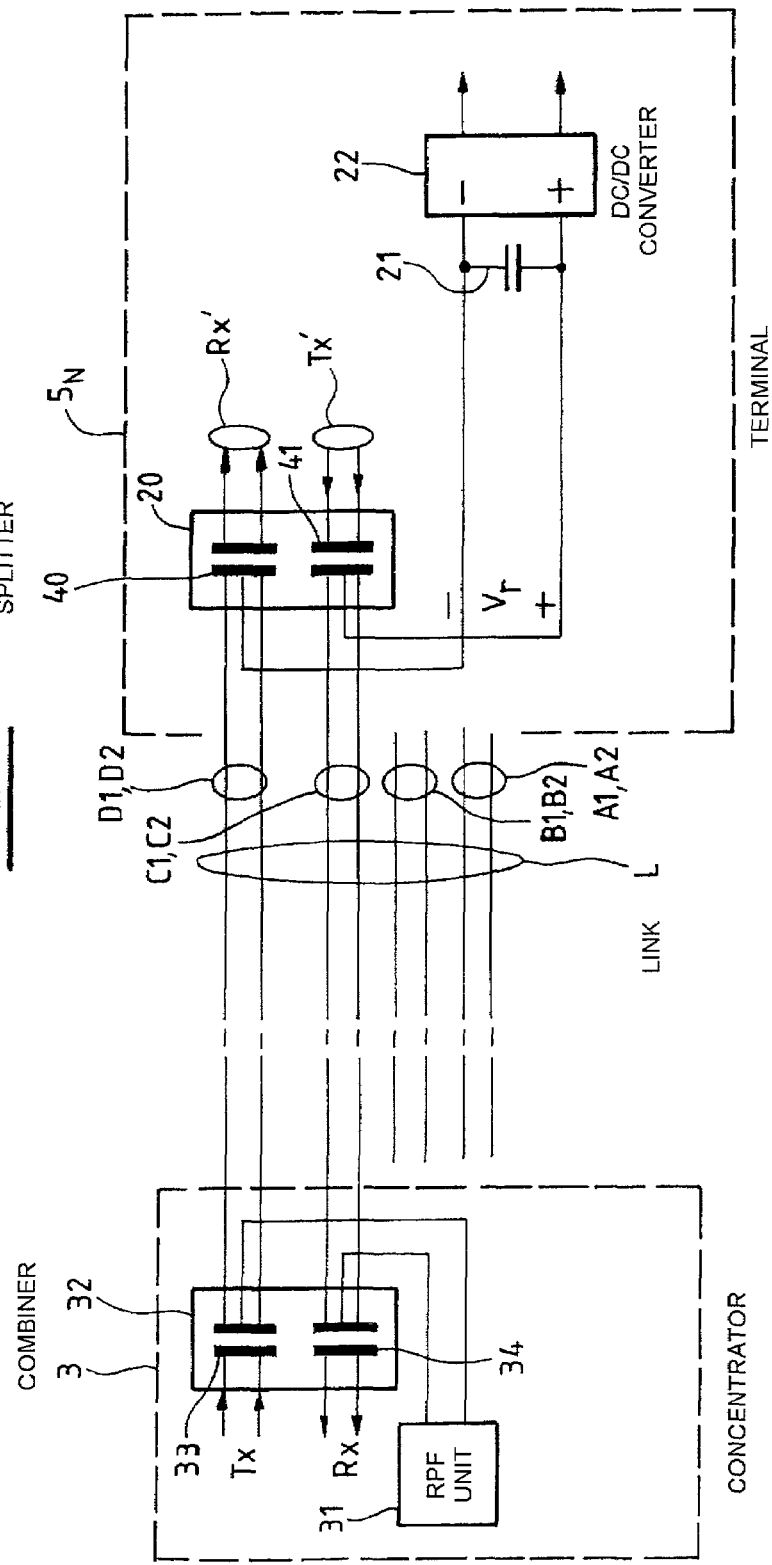
FIG_2

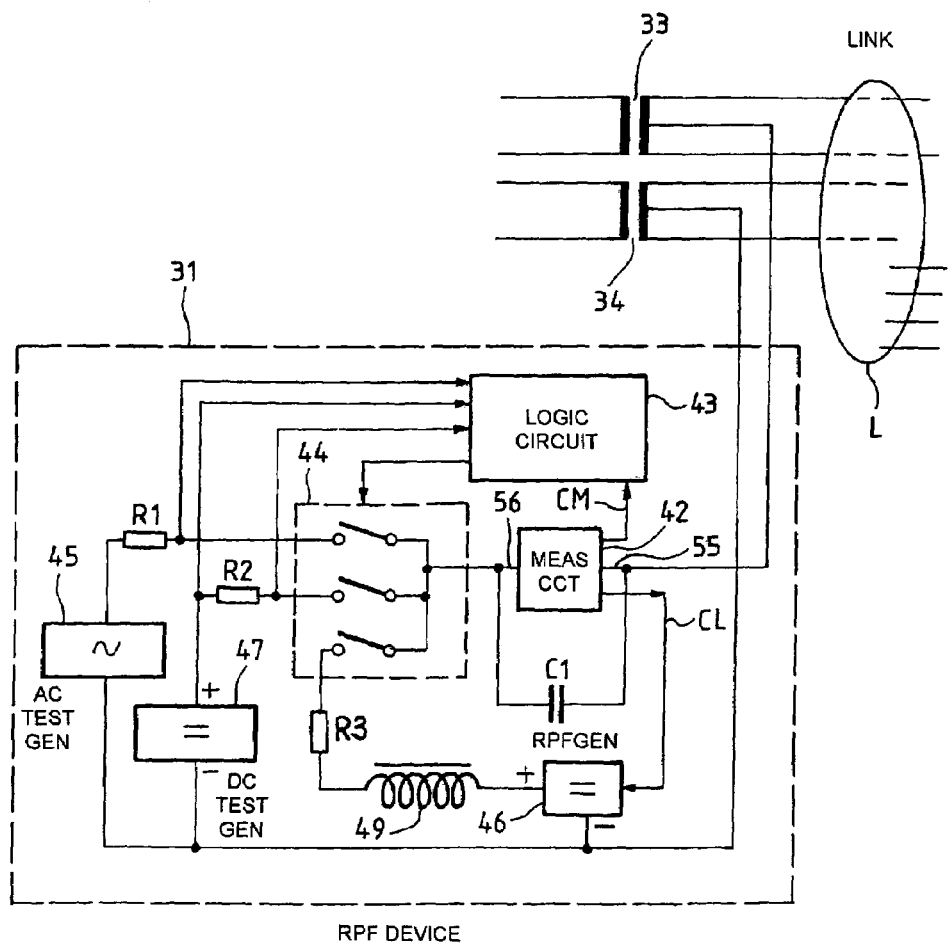

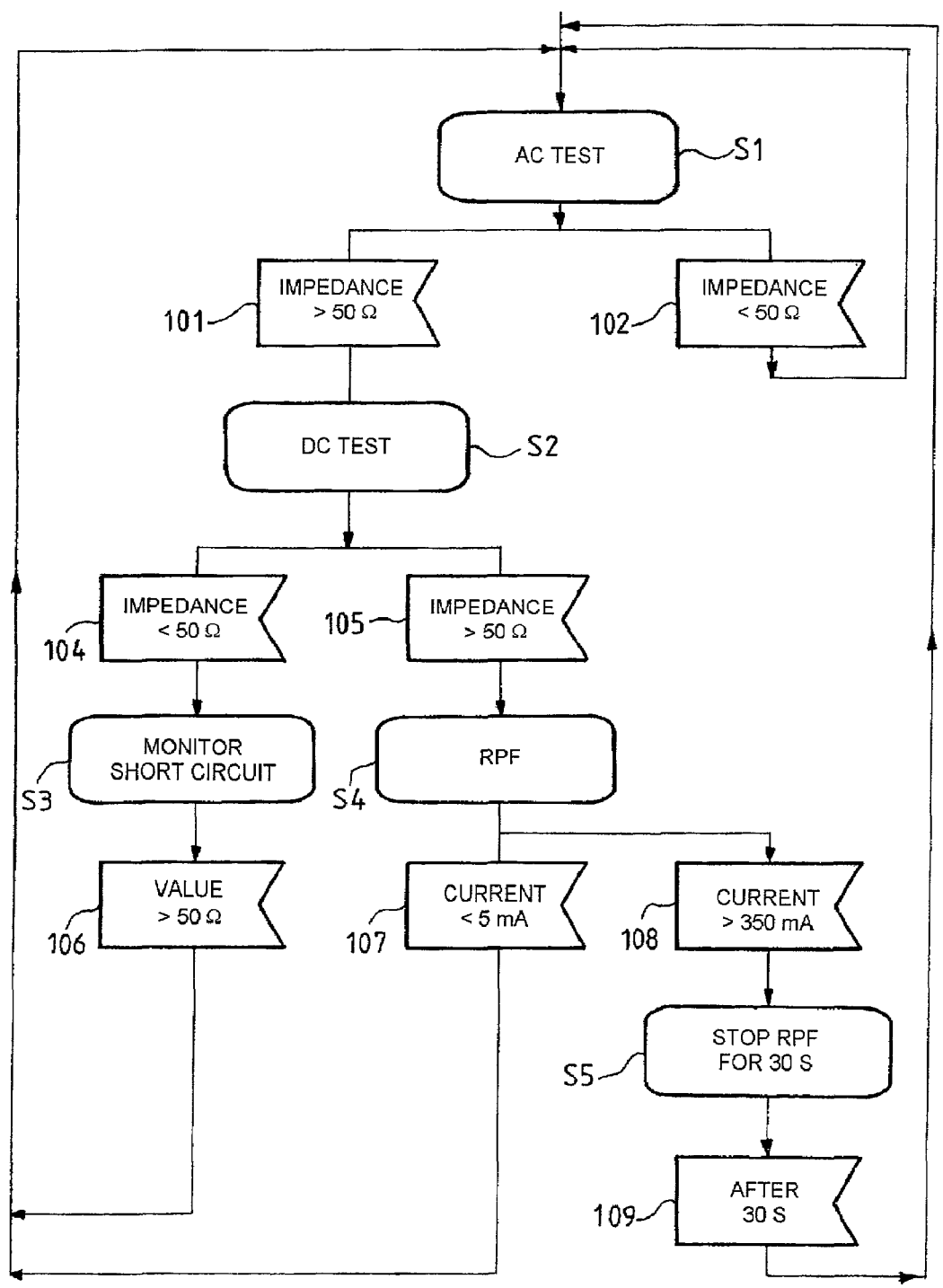

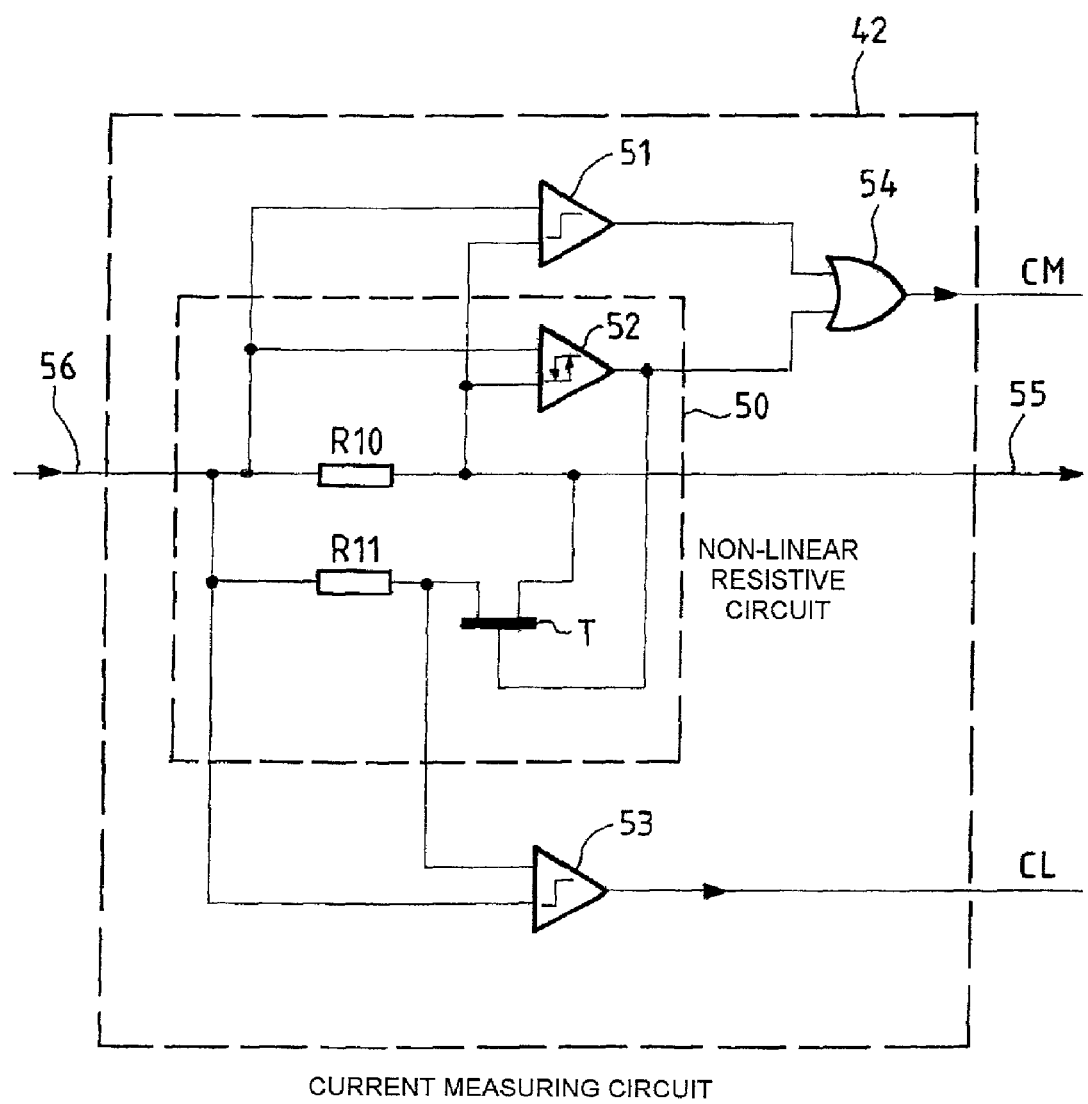

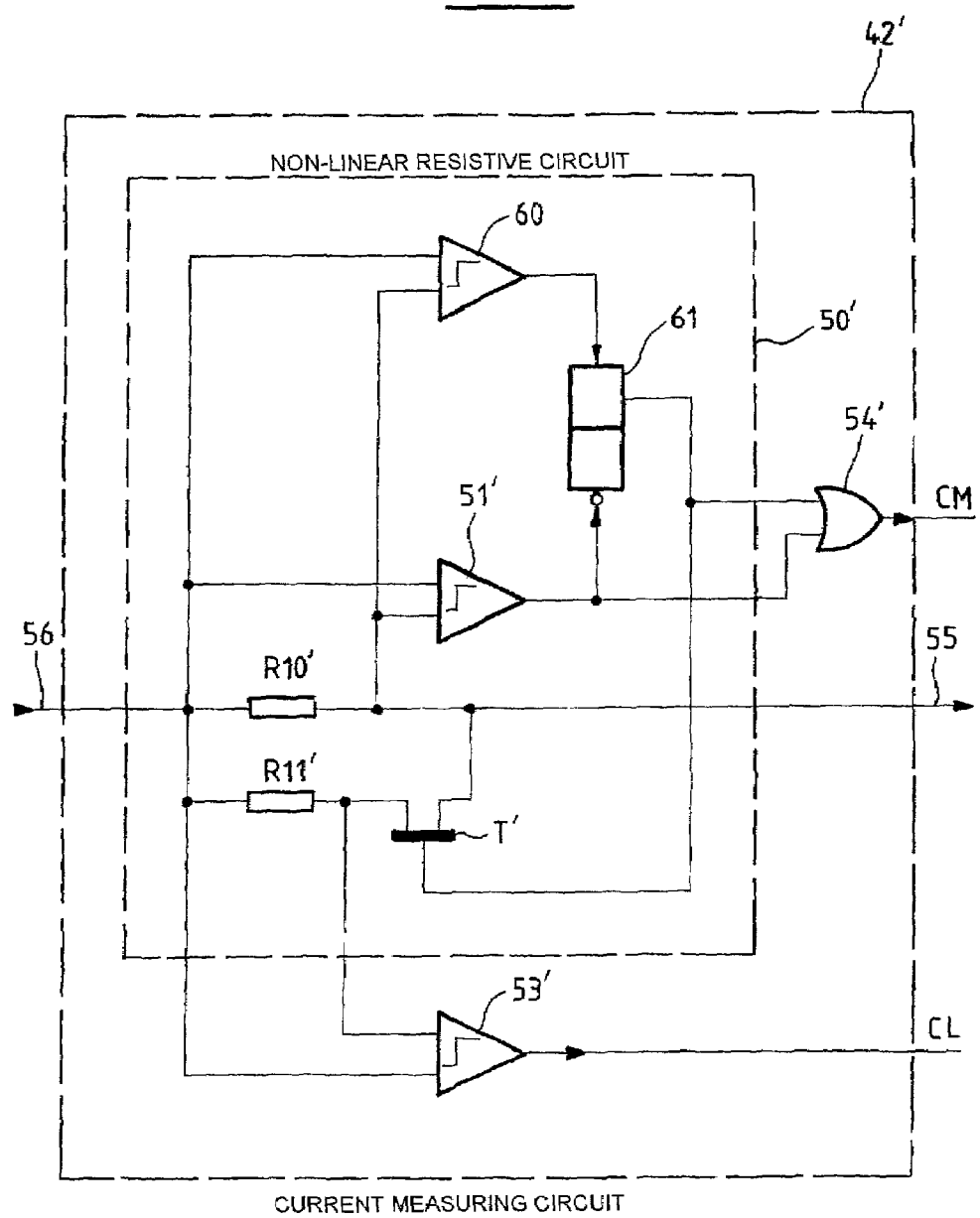
FIG_6

DEVICE FOR REMOTE POWER FEEDING A TERMINAL IN A TELECOMMUNICATION NETWORK, AND A CONCENTRATOR AND A REPEATER INCLUDING THE DEVICE

CROSS-REFERENCE TO RELATED APPLICATIONS

This application is based on French Patent Application No. 01 00 168 filed Jan. 8, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates generally to a telecommunication network, in particular a computer local area network, for example an Ethernet network, or a telephone network. To be more precise, the invention relates to a device for providing a remote power feed to a terminal in this kind of network.

2. Description of the Prior Art

Terminals connected to a computer local area network (for example: personal computers, printers, etc) are conventionally powered locally from the mains electrical power supply. It is desirable for some terminals to receive a remote power feed via the link used to send and receive data. To facilitate addition to an existing network, it is also desirable for it to be possible to install the remote power feed device anywhere on the link: either inside or outside a repeater or a concentrator.

One way to transmit a remote power feed current is to use two of the eight wires of the link: four other wires of the eight wires constitute two pairs of wires respectively used to transmit and receive data. Another approach, known as a phantom circuit, connects the two terminals of a power supply generator to respective center-taps of a transformer winding connected to the data receive pair and a winding of another transformer connected to the data send pair, in the remote power feed device. At the terminal end, the supply voltage is obtained at the respective center-taps of a transformer winding connected to the data receive pair and a winding of another transformer connected to the data send pair.

In both cases, providing a remote power feed to the terminal via the computer local area network has the disadvantage that the remote power feed device powers a terminal "blind". A female RJ45 connector at the end of the link can be connected to a terminal that is not adapted to receive a remote power feed (for example a personal computer, a printer, etc.). There is a risk of damaging the electrical circuits of that terminal. The male RJ45 connector of a terminal is generally used in the following manner:

Four of the eight wires are divided into two pairs for respectively transmitting and receiving data. The terminal includes a transformer having a winding connected to the receive pair and a transformer having a winding connected to the send pair, each of those windings have a center tap that can be connected to a reference potential via a low-resistance resistor.

Four other wires, which are not used, are connected to ground, often via a combination of resistors and capacitors, to eliminate any crosstalk currents induced by the data signals flowing in the first four wires, and to reduce unwanted electromagnetic emissions. If a relatively high supply voltage, for example 48 volts, is applied to that combination of resistors and capacitors, or to the resistors connected to the center taps of the transformers, the current flowing in the resistors can destroy them, and the send and receive circuits.

Automatic identification methods are currently being studied with a view to eliminating all risk of damage if a terminal is connected that is not adapted to receive a remote power feed via the network.

One such method consists of:

producing a test signal, or a plurality of test signals, on at least two conductors of a link for connecting the local area network to a remote terminal, the signal(s) having an energy such that the terminal cannot be damaged under any circumstances;

detecting the presence of a remote terminal adapted to receive a remote power feed by detecting the presence of an identification module in the remote terminal, shunting the link, on the basis of the current created by the test signal or signals in the link; and sending a remote power feed current over the link if and only if the presence of a terminal adapted to receive a remote power feed is detected.

A method of this kind avoids all risk to the terminals, because the remote power feed current is sent only after identifying the terminal as one that is adapted to receive a remote power feed. The intensity and the duration of the test signal or signals are chosen so that the operation of detecting the presence of a terminal adapted to receive a remote power feed before providing the remote power feed cannot cause any damage if the terminal is not adapted to receive a remote power feed.

On the other hand, the remote power feed must be interrupted as soon as the terminal is disconnected from the link, because another could be connected to it at any time. There is therefore provision for continuously detecting the presence of a terminal during the provision of the remote power feed by measuring the remote power feed current. The remote power feed device concludes that the terminal has been disconnected if it detects that the current drawn falls below a predetermined threshold value (for example 1 mA) during a time period having a predetermined duration that is sufficient to be sure that there has been a disconnection. Measuring a current by measuring the voltage across a resistor is known in the art. For a comparator to be able to detect reliably if the voltage drop is greater than or less than a threshold value, a voltage drop of at least 50 mV is required, because of noise and the DC voltage offset to which the voltage measuring circuit may be subjected. This leads to using a resistor with a resistance of least 50 ohms to detect if the current is greater than a threshold value of 1 mA.

Furthermore, it is necessary to measure the remote power feed current to control a current limiter responsible for protecting the remote power feed device and the terminal against overcurrents. The maximum permitted current is typically 350 mA, in which case a resistance of 50 ohms produces a non-negligible voltage drop of 17.5 V and a non-negligible dissipation of 6 W.

A similar problem arises in producing a subscriber line interface card for a telephone exchange. This kind of card provides the remote power feed to a telephone terminal connected to the end of a line. It must detect line seizure by detecting that the remote power feed current rises above a threshold value. If it is required to be able to connect different types of terminals, which draw very different currents, to the same type of card, the card must not cause a significant voltage drop when the terminal is drawing a current very much higher than the threshold value (in normal operation).

The object of the invention is to be able to detect if a terminal is drawing a current greater than at least one given threshold value, without impeding the operation of the terminal if the terminal in fact needs a current very much greater than the given threshold value, and avoiding a non-negligible voltage drop and power loss in the remote power feed device.

SUMMARY OF THE INVENTION

The invention provides a remote power feed device for supplying a remote power feed to a terminal in a telecommunication network, the device including a measuring device for determining at least if the remote power feed current is greater than a first threshold current, the remote power feed current being able to assume a value very much greater than the first threshold current, and the measuring device including a resistive circuit through which the remote power feed current flows and which has a resistance that varies as a function of the current flowing through it, the resistance being lower if the current is very much greater than the first threshold current, and means for comparing the voltage across the resistive circuit with a first threshold voltage.

The above device causes a voltage drop that is just as negligible when the current is very much greater than the threshold value as when it is close to that threshold value, because the reduced resistance of the device when the current becomes very much greater than the threshold value tends to compensate the increased voltage drop due to the increased current.

In one particular embodiment, for determining if the remote power feed current is greater than a first threshold current and for determining if the remote power feed current is greater than a second threshold current which is higher than the first threshold current, the current-measuring device including means for comparing the voltage across the resistive circuit with a second threshold voltage and the resistive circuit having a resistance that varies as a function of the current flowing through it, the resistance being lower if the current is close to the second threshold current than if it is in the vicinity of the first threshold current.

In one particular embodiment, the resistive circuit includes a first resistor, a second resistor in parallel with the first resistor and having a lower resistance than the first resistor, and a switching device for either connecting the first resistor in series in the remote power feed circuit if the switching device detects that the remote power feed current is less than a third threshold current that is between the first and second threshold currents or connecting the second resistor and the first resistor, connected in parallel, in series in the remote power feed circuit if the switching device detects that the remote power feed current is greater than the third threshold current.

The above device easily achieves good accuracy in comparing the current to the two threshold values, because the resistance of the resistive circuit is switched suddenly between two perfectly defined values.

The invention also provides a repeater and a concentrator including the above kind of remote power feed device.

The invention will be better understood and other features will become apparent from the following description and the accompanying drawings.

BRIEF DESCRIPTION OF THE DRAWINGS

FIG. 1 is a block diagram of a portion of one example of a local area network including concentrators and repeaters each incorporating one embodiment of a remote power feed device according to the invention.

FIG. 2 is a block diagram of a concentrator including one embodiment of the remote power feed device and one embodiment of a terminal adapted to receive a remote power feed.

FIG. 3 is a more detailed block diagram of the embodiment of the remote power feed device shown in FIG. 2.

FIG. 4 shows diagrammatically changes of state occurring in the embodiment of the remote power feed device shown in FIG. 3.

FIG. 5 is a block diagram of a current-measuring circuit used in the embodiment of the remote power feed device shown in FIG. 2.

FIG. 6 is a block diagram of a different embodiment of the current-measuring circuit shown in FIG. 5.

DETAILED DESCRIPTION OF THE PREFERRED EMBODIMENTS

FIG. 1 is a block diagram of part of one embodiment of an Ethernet computer local area network including a concentrator 3 and repeaters RP1, . . . , RPM each incorporating one embodiment of a remote power feed device according to the invention. The local area network further includes a local area network server 1, a switch 2, M terminals 41 to 4M connected to the concentrator 3 via the respective repeaters RP1, . . . , RPM, because of the distance, and N terminals 51 to 5N connected directly to the concentrator 3. The terminals are telephones operating in voice over IP (VoIP) mode, for example.

The server 1 is connected to the Internet 0. It sends and receives TCP/IP packets. The packets of a given call are routed via the switch 2 and the concentrator 3 to a terminal such as the terminal 41, which is connected to the concentrator 3 via an 8-wire link L with RJ45 connectors.

FIG. 2 shows a block diagram of one embodiment of a remote power feed device in the concentrator 3 and one embodiment of a terminal 5N receiving a remote power feed via the link L connecting it to the concentrator 3.

The link L includes four pairs:

A1, A2, not used,

B1, B2, not used,

C1, C2, used to transmit data to the network, in differential mode, and

D1, D2, used to transmit data to the terminal, in differential mode.

The pairs C1, C2 and D1, D2 are also used in common mode to provide a remote power feed to the terminal 5N via a phantom circuit.

The concentrator 3 includes a remote power feed unit 31 which can detect the presence of a terminal adapted to receive a remote power feed and a combiner 32. The combiner 32 includes two transformers 33 and 34 respectively transmitting a signal Tx to be sent to a terminal and signal Rx received from a terminal. They each include a first winding and a second winding. The first windings are respectively connected to the pairs D1, D2 and C1, C2. They each have a respective center tap connected to an output of the unit 31 which provides a remote power feed and detects the presence of a terminal adapted to receive a remote power feed. The second windings are connected to other concentrators 3, not shown.

The terminal 5N includes a separator 20 and a DC-DC converter 22 for reducing the remote power feed voltage. The separator 20 includes two transformers 41 and 40 for respectively transmitting a signal Tx' to be sent to the concentrator 3 and transmitting a signal Rx' received by the terminal 5N. They each include a first winding and a second winding. The first windings are respectively connected to the pairs D1, D2 and C1, C2. They each have a center tap. The center taps supply a DC remote power feed voltage Vr. In this example, the center tap of the first winding of the transformer 41 constitutes the positive pole of the remote power feed. It is connected via a diode D2 to a positive input of the converter 22. The center tap of the second winding of the transformer 40 constitutes the negative pole of the remote power feed. It is connected directly to a negative input of a converter 22.

The remote power feed unit 31 uses an identification module 21 in the terminal and shunting the two poles of the remote power feed to recognize that the terminal is adapted to receive a remote power feed. The electrical characteristics of the identification module 21 are chosen so that it does not short circuit the remote power feed voltage applied to the converter 22 and is easy to distinguish from the terminations that are usually connected to the available conductors of the RJ45 connectors of the terminals. The module 21 is a capacitor connected between the two remote power feed poles, for example. The capacitor can be the filter capacitor conventionally provided at the input of a voltage converter. The remote power feed device in accordance with the invention can be used regardless of the type of identification module used in the terminals.

In one embodiment, instead of providing a remote power feed via a phantom circuit, and depending on the power needed by the terminal, it is possible to provide a remote power feed via:

the conductors A1, A2 only, or
B1, B2 only, or
via A1, A2, B1 and B2 simultaneously, or
via A1, A2, B1, B2 and the phantom circuit simultaneously.

FIG. 3 is a more detailed block diagram of the remote power feed device 31 which is included in the concentrator 3 for providing a remote power feed via a phantom circuit using common modes on two data send/receive pairs and includes:

a current-measuring circuit 42 having an input 56 and an output 55 for the remote power feed current, the output being connected to the center tap of the transformer 33;

a switch 44 having three inputs and one output, the output being connected to the input 56 of the current-measuring circuit 42;

a capacitor C1 connected between the input 56 and the output 55 of the circuit 42;

a test AC voltage generator 45 (supplying a sinusoidal signal at a few volts and at a frequency of 10 kilohertz, for example), having one terminal connected to the center tap of the transformer 34 and another terminal connected to a first terminal of a resistor R1; the second terminal of the resistor R1 is connected to a first input of the switch 44;

a generator 46 generating a DC remote power feed voltage (48 V, for example) and having a control input connected to an output CL of the current-measuring circuit 42, a negative terminal connected to the center tap of the transformer 34, and a positive terminal connected to a first terminal of a resistor R3 via an inductor 49; the second terminal of the resistor R3 is connected to a second input of the switch 44;

a generator 47 generating a DC test voltage (5 volts, for example) and having a positive terminal connected to the center tap of the transformer 34 and a negative terminal connected to a first terminal of a resistor R2; the second terminal of the resistor R2 is connected to a third input of the switch 44; and a logic circuit 43 having one input connected to the second terminal of the resistor R1, two inputs connected to the respective terminals of the resistor R2, an input connected to an output CM of the current-measuring circuit 42, and an output which controls the switch 44.

The output CM of the current-measuring circuit 42 supplies a signal to the logic circuit 43 when the remote power feed current is greater than the minimum value 1 mA, which indicates that the terminal is still connected.

The output CL of the current-measuring circuit 42 supplies a signal to the remote power feed generator 46 when the remote power feed current is greater than 350 mA, which indicates that there is a fault in the terminal or on the line, and that the remote power feed must therefore be interrupted.

In this example:
R1=75 ohms,
R2=2 ohms,
R3=10 ohms, and
C1=1 microfarad.

The inductance of the inductor 49 in series with the generator 46 is such that, if the generators 45 and 46 are coupled simultaneously to the remote terminal, the attenuation of the AC test signal caused by the generator 46 is negligible. In different embodiments, this function can be provided by means of an active circuit.

The capacitance of the capacitor C1 is chosen in order to transmit the AC detection signal with negligible attenuation. The voltage of the AC generator 45 and the resistance of the resistor R1 are chosen to produce a test current that represents no danger to any terminal that might be connected to the end of the link, especially if that terminal is not adapted to receive a remote power feed. The DC test voltage supplied by the generator 47 is very much lower than the remote power feed voltage, so that there is no danger to terminals not adapted to receive a remote power feed. Also, the voltage is insufficient to start the converter 22 of a terminal adapted to receive a remote power feed. The converter 22 is therefore seen as an open circuit during the DC test.

The current-measuring device according to the invention can be used regardless of the type of test used to identify the type of terminal.

FIG. 4 shows diagrammatically changes of state occurring in the remote power feed unit 31 shown in FIG. 3. On starting up, it is in a state S1 to carry out an AC test to detect the presence of a terminal adapted to receive a remote power feed, in which state the logic circuit 43 operates the switch 44 to connect only its first input to its output. The remote power feed voltage is not applied to the link L, and there is therefore no risk to a conventional terminal. The switch 44 transmits an alternating current. The logic circuit 43 compares the AC voltage present at the second terminal of the resistor R1 with a threshold voltage corresponding to a modulus of impedance of 50 ohms, for example. There are two possible outcomes:

Event 102: the modulus of impedance is greater than 50 ohms, there is an open circuit for the alternating current, there is therefore no terminal connected to the end of the link, and the circuit 43 remains in the state S1 to continue the alternating current test.

Event 101: the modulus of impedance is less than 50 ohms, there is a short circuit at least for the alternating current, there may therefore be a terminal adapted to receive a remote power feed connected to the end of the line, or a short circuit between two conductors of the line; the circuit 43 goes to a state S2 enabling these two situations to be discriminated by means of a direct current test, which applies a low voltage for a short duration. The direct current is supplied by the generator 47. During this test the converter 22 of the terminal has a high resistance because it receives an input voltage insufficient for it to be able to start.

The test carried out in the state S2 has two possible outcomes:

Event 105: the modulus of impedance is greater than 50 ohms, there is an open circuit for the direct current, there is therefore no conventional terminal connected to the end of the link; the terminal connected to the end of the link is adapted to receive a remote power feed or is a terminal with a local power supply backed up by a remote power feed. The circuit 43 goes to a state S4 to provide a remote power feed to the terminal and continues the alternating current test to detect possible disconnection of the terminal that has been detected.

Event 104: the modulus of impedance is less than 50 ohms, and there is therefore a short circuit for the direct current in the terminal or on the link; there is therefore a conventional terminal (having a termination including a short circuit) or an accidental short circuit, into which the remote power feed current must not be sent; the circuit 43 goes to a state S3 to monitor disappearance of the short circuit.

In the state S3, and periodically, for example once per second, the circuit 43 carries out a test using a low DC voltage and a short duration to detect the disconnection of a conventional terminal. The remote power feed unit 31 supplies a direct current of sufficiently low value and duration to test the presence of a conventional terminal without risk of damaging it. The circuit 43 operates the switch 44 to connect only its second input to its output for only 150 milliseconds. After 100 milliseconds (necessary for any capacitor to have time to charge), the circuit 43 measures the voltage at the terminals of R2. If that voltage is zero, the circuit is an open circuit for the direct current. The remote power feed voltage is not applied to the link L during this test. The voltage applied for this test is 5 volts in this example. There is therefore no risk to any terminal. The logic circuit 43 compares the DC voltage measured at the terminals of the resistor R2 with a single threshold value, corresponding to a resistance equal to 50 ohms, for example.

The test is repeated until the value becomes greater than 50 ohms (event 106): the circuit 41 then returns to the state S1 to detect possible connection of a terminal adapted to receive a remote power feed.

In the state S4, the unit 31 supplies a remote power feed current to the terminal adapted to receive a remote power feed that has been detected and monitors the occurrence of two events:
  disconnection of the terminal adapted to receive a remote power feed that has been detected, or
  failure of the link or the terminal creating a direct current short circuit.

The circuit 43 operates the switch 44 to connect its third input to its output. A remote power feed current is therefore supplied to the link L. A direct current flows in the current-measuring circuit 42 for as long as the terminal adapted to receive a remote power feed remains connected to the end of the line L. The circuit 42 monitors the current relative to the threshold values of 1 mA and 350 mA. Two events can occur during the state S4:

Event 107: the current falls below 1 mA indicating that the terminal adapted to receive a remote power feed has been disconnected; the circuit 43 returns to the state S1. The remote power feed voltage is no longer applied to the link, and so any other terminal can be connected in total safety.

Event 108: the current becomes greater than 350 mA, indicating that there is a fault either on the link or in the terminal. The circuit 43 enters a state S5 in which it stops the remote power feed for 30 seconds, for example, to prevent any damage being caused by the remote power feed current. Then, at the end of the 30 seconds (event 109), it returns to the state S1, in which the previous tests are repeated.

FIG. 5 is a block diagram of the current-measuring circuit 42 used in the remote power feed unit 31. It includes:
  a non-linear resistive circuit 50 including a 50 ohms resistor R10, a 1 ohm resistor R11, a field-effect transistor T and a hysteresis comparator 52 having a threshold voltage equal to 50 mV for a decreasing voltage and a threshold voltage equal to 2.5 V for an increasing voltage, these two threshold voltages corresponding to a third current threshold between the two current thresholds to be monitored (1 mA and 350 mA) and equal to 50 mA;
  a comparator 51 having two inputs connected to respective terminals of the resistor R10 and an output supplying a logic signal if the voltage drop across the resistor R10 exceeds a threshold voltage equal to 50 mV;
  a comparator 53 having two inputs connected to respective terminals of the resistor R11 and an output constituting the output CL and supplying a logic signal if the voltage drop across the resistor R11 exceeds a threshold voltage equal to 350 mV; and
  an OR logic gate 54 having two inputs connected to respective outputs of the comparator 51 and 52 and an output constituting the output CM.

A first terminal of the resistor R10 is connected to the input 56 of the non-linear resistive circuit 42. Its second terminal is connected to the output 55 of the non-linear resistive circuit 42. A first terminal of the resistor R11 is connected to the input 56 of the non-linear resistive circuit 42. Its second terminal is connected to the output 55 of the non-linear resistive circuit 42 via the transistor T. The control gate of the transistor T is connected to the output of the comparator 52.

The comparator 52 has two inputs connected to the respective terminals of the resistor R10 and an output supplying a logic signal which changes from 0 to 1 if the voltage drop across the resistor R10 exceeds a threshold of 2.5 V and returns from the value 1 to the value 0 if the voltage drop across the resistor R10, which is connected in parallel with the resistor R11 at this time, falls below another threshold equal to 50 mV.

The transistor T is therefore turned on if the voltage between the inputs of the comparator 52 becomes greater than 2.5 V and is turned off again if the voltage between the inputs of the comparator 52 falls below 50 mV. The transistor T is used as an electronic switch for connecting the resistor R11 in parallel with the resistor R10 to decrease the resistance of the resistive circuit 50 from 50 ohms to approximately 1 ohm if the remote power feed current becomes greater than the third current threshold (close to 50 mA), and then to increase it from 1 ohm to approximately 50 ohms if the remote power feed current falls below the third current threshold. The output of the comparator 52 supplies a logic signal of 1 as soon as the voltage drop across the 50 ohms resistor R10 exceeds a threshold of 2.5 V, i.e. as soon as the current is greater than 50 mA. However, this logic signal returns to 0 if the voltage drop across the resistor R10 in parallel with the resistor R11 (i.e. approximately 1 ohm) becomes less than the 50 mV threshold, i.e. as soon as the current is less than 50 mA.

The OR gate 54 supplies a logic signal of 1 indicating that the terminal continues to be present, both in the situation in which the remote power feed current flows through only the resistor R10 and in the situation in which it flows through the resistors R10 and R11 in parallel. When the current is less than 50 mA, the OR gate 54 supplies a logic signal of 1 as soon as the comparator 51 has detected a current greater than 1 mA in only the 50 ohms resistor R10. The comparator 52 commands parallel connection of the resistors R10 and R11 if the current exceeds 50 mA. The comparator 51 then no longer supplies a logic signal of 1, because the voltage drop is only 50 mV for a current of 50 mA. The OR gate 54 nevertheless supplies a logic signal of 1, because the comparator 51 detects a current greater than 50 mA in the resistors R10 and R11 in parallel, equivalent to a resistance of 1 ohm.

FIG. 6 is a block diagram of a different embodiment 42' of the current-measuring circuit shown in FIG. 5. The circuit includes a comparator 51', a comparator 53' and an OR gate 54' respectively analogous to the comparator 51, the comparator 53 and the OR gate 54. They have the same respective functions. The non-linear resistive circuit 50 is replaced by a non-linear resistive circuit 50'. The comparator 51' is also part of the non-linear circuit 50'.

The circuit 50' further includes:
- a 50 ohms resistor R10';
- a 1 ohm resistor R11';
- a field-effect transistor T';
- a comparator 60 (without hysteresis) having two inputs connected to respective terminals of the resistor R10' and an output supplying a logic signal if the voltage drop across the resistor R10 exceeds a voltage threshold equal to 2.5 V, corresponding to a third current threshold between the two current thresholds to be monitored (1 mA and 350 mA) and equal to 50 mA;
- a comparator 51' having two inputs connected to respective terminals of the resistor R10' and an output supplying a logic signal of 1 if the voltage drop across the resistor R10' exceeds a voltage threshold equal to 50 mV corresponding to the current threshold equal to 1 mA if the remote power feed current flows through only the resistor R10' and corresponding to the current threshold equal to 50 mA if the remote power feed current flows through the resistor R10' and the resistor R10' in parallel; and
- a bistable 61 having a set to 1 input connected to the output of the comparator 60, a reset to 0 input connected to the output of the comparator 51' and an output connected to the control gate of the transistor T' and to an input of the OR gate 54'.

The first terminal of the resistor R10' is connected to the input 56 of the non-linear resistive circuit 42'. Its second terminal is connected to the output 55 of the non-linear resistive circuit 42'. A first terminal of the resistor R11' is connected to the input 56 of the non-linear resistive circuit 42'. Its second terminal is connected to the output 55 of the non-linear resistive circuit 42' via the transistor T'. The transistor T' is used as an electronic switch for connecting the resistor R11' in parallel with the resistor R10' to decrease the resistance of the resistive circuit 50' from 50 ohms to approximately 1 ohm if the remote power feed current becomes greater than the third threshold current (50 mA) and then to increase it from 1 ohm to 50 ohms if the remote power feed current falls below the third threshold current.

The bistable 61 is set to 1 if the comparator 60 detects that the current in the resistor R10' exceeds 50 mA and is reset to 0 if the comparator 51' detects that the current in the resistor R11' in parallel with the resistor R10' has fallen below 50 mA.

The OR gate 54' supplies a logic signal of 1 indicating that the terminal continues to be present both in the situation in which the remote power feed current flows through only the resistor R10' and in the situation in which it flows through the resistors R10' and R11' in parallel. If the current is less than 50 mA, the OR gate 54' supplies a logic signal of 1 as soon as the comparator 51' has detected a current of more than 1 mA in only the 50 ohms resistor R10'. The comparator 60 commands setting to 1 of the bistable 61, and thus parallel connection of the resistors R10' and R10', if the current exceeds 50 mA. The comparator 51' then no longer supplies the logic signal of 1 because the voltage drop is only 50 mV for a current of 50 mA. The OR gate 54' nevertheless supplies a logic signal of 1 because the output of the bistable 61 continues to supply a logic signal of 1.

The scope of the invention is not restricted to the embodiments described above. The device having a non-linear resistance can include an active or passive non-linear component of a type known in the art whose resistance decreases continuously when the current increases, the two threshold voltages being chosen as a function of the characteristic of the component and of each threshold current.

What is claimed is:

1. A remote power feed device for supplying a remote power feed to a terminal in a telecommunication network, said device including:
   - a measuring device for determining at least if the remote power feed current is greater than a first threshold current,
   - said remote power feed current being able to assume a value very much greater than said first threshold current,
   - said measuring device including a resistive circuit through which said remote power feed current flows and which has a resistance that varies as a function of the current flowing through it, and
   - said resistance being lower if said current is very much greater than said first threshold current; and
   - means for comparing the voltage across said resistive circuit with a first threshold voltage.

2. The device claimed in claim 1, including a current-measuring device for determining if said remote power feed current is greater than a first threshold current and for determining if said remote power feed current is greater than a second threshold current which is higher than said first threshold current, said current-measuring device including means for comparing the voltage across said resistive circuit with a second threshold voltage, and said resistive circuit having a resistance that varies as a function of the current flowing through it, said resistance being lower if said current is close to said second threshold current than if it is in the vicinity of said first threshold current.

3. The device claimed in claim 2, wherein said resistive circuit includes:
a first resistor;
a second resistor in parallel with said first resistor and having a lower resistance than said first resistor; and
a switching device for
either connecting said first resistor in series in said remote power feed circuit if said switching device detects that said remote power feed current is less than a third threshold current that is between said first and second threshold currents, or
connecting said second resistor and said first resistor, connected in parallel, in series in said remote power feed circuit if said switching device detects that said remote power feed current is greater than said third threshold current.

4. The device claimed in claim 3, wherein said switching device comprises a transistor which is connected in series with said second resistor, and which is conducting only when said remote power feed current is greater than said third threshold current.

5. A repeater including a remote power feed device as claimed in claim 1.

6. A concentrator including a remote power feed device as claimed in claim 1.

* * * * *